(12) United States Patent
Karlinsky et al.

(10) Patent No.: US 11,481,623 B2
(45) Date of Patent: Oct. 25, 2022

(54) SYSTEMS AND METHODS FOR TRAINING A MODEL USING A FEW-SHOT CLASSIFICATION PROCESS

(71) Applicant: International Business Machines Corporation, Armonk, NY (US)

(72) Inventors: Leonid Karlinsky, Mazkeret Batya (IL); Joseph Shtok, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 16/581,892

(22) Filed: Sep. 25, 2019

(65) Prior Publication Data

US 2021/0089880 A1 Mar. 25, 2021

(51) Int. Cl.
| | |
|---|---|
| *G06F 16/00* | (2019.01) |
| *G06N 3/08* | (2006.01) |
| *G06F 16/28* | (2019.01) |
| *G06F 16/2457* | (2019.01) |

(52) U.S. Cl.
CPC ......... *G06N 3/08* (2013.01); *G06F 16/24573* (2019.01); *G06F 16/285* (2019.01)

(58) Field of Classification Search
None
See application file for complete search history.

(56) References Cited

U.S. PATENT DOCUMENTS

2014/0376804 A1* 12/2014 Akata ................. G06K 9/6234
382/159
2017/0109610 A1 4/2017 Macciola et al.

FOREIGN PATENT DOCUMENTS

CN 102930533 2/2013

OTHER PUBLICATIONS

Rinu Boney et al., "Semi-Supervised Few-Shot Learning with Prototypical Networks", 31st Conference on Neural Information Processing Systems (NIPS), 2017, Long Beach, CA, USA.
Boris N. Oreshkin et al., "TADAM: Task dependent adaptive metric for improved few-shot learning", arXiv, Jan. 25, 2019.
Swami Sankaranarayanan et al., "Learning from Synthetic Data: Addressing Domain Shift for Semantic Segmentation", arXiv, Apr. 1, 2018.

(Continued)

*Primary Examiner* — Anhtai V Tran
(74) *Attorney, Agent, or Firm* — Roy S. Melzer (57) ABSTRACT

There is provided a method of computing a model for classification of a data element, comprising: feeding a plurality of labeled auxiliary data elements and at least one labeled relevant data elements for each of a plurality of relevant classification categories, into a synthesizer component, for outputting at least one synthetic labeled relevant data element for each one of the plurality of relevant classification categories, feeding the synthetic labeled relevant data elements and a plurality of unlabelled training relevant data elements into a domain adaptation component, for outputting a respective relevant classification category for each of the plurality of unlabelled training relevant data elements, iteratively end-to-end training the synthesis component and the domain adaptation component, and providing the trained domain adaption component, for outputting a relevant classification category in response to an input of a query unlabelled data element.

20 Claims, 7 Drawing Sheets

(56) References Cited

OTHER PUBLICATIONS

Amir Atapour-Abarghouei et al., "Real-time monocular depth estimation using synthetic data with domain adaptation", IEEE/CVF Conference on Computer Vision and Pattern Recognition (CVPR), 2018.
Yu-Xiong Wang, "Low-Shot Learning from Imaginary Data", arXiv, Apr. 3, 2018.
Eli Schwartz et al., "Delta-encoder: an effective sample synthesis method for few-shot object recognition", 32nd Conference on Neural Information Processing Systems (NeurIPS), 2018, Montréal, Canada.

\* cited by examiner

SYSTEMS AND METHODS FOR TRAINING A MODEL USING A FEW-SHOT CLASSIFICATION PROCESS

BACKGROUND

The present invention, in some embodiments thereof, relates to machine learning and, more specifically, but not exclusively, to systems and methods for training a model using a few-shot classification process.

A few-shot classification process trains a model to classify previously unseen data elements, for example, images, using few labeled training data elements.

SUMMARY

According to a first aspect, a method of computing a model for classification of a data element, comprises: feeding a plurality of labeled auxiliary data elements and at least one labeled relevant data elements for each of a plurality of relevant classification categories, into a synthesizer component, for outputting at least one synthetic labeled relevant data element for each one of the plurality of relevant classification categories, feeding the synthetic labeled relevant data elements and a plurality of unlabelled training relevant data elements into a domain adaptation component, for outputting a respective relevant classification category for each of the plurality of unlabelled training relevant data elements, iteratively end-to-end training the synthesis component and the domain adaptation component, and providing the trained domain adaption component, for outputting a relevant classification category in response to an input of a query unlabelled data element.

According to a second aspect, a method of classifying a query data element into a classification category by a model, comprises: feeding a query data element into a domain adaption component trained by: feeding a plurality of labeled auxiliary data elements and at least one labeled relevant data elements for each of a plurality of relevant classification categories, into a synthesizer component, for outputting at least one synthetic labeled relevant data element for each one of the plurality of relevant classification categories, feeding the synthetic labeled relevant data elements and a plurality of unlabelled training relevant data elements into a domain adaptation component, for outputting a respective relevant classification category for each of the plurality of unlabelled training relevant data elements, and iteratively end-to-end training the synthesis component and the domain adaptation component, and outputting a relevant classification category for the query data element by the trained domain adaptation component.

According to a third aspect, a system for computing a neural network model for classification of a data element, comprises: at least one hardware processor executing a code for: feeding a plurality of labeled auxiliary data elements and at least one labeled relevant data elements for each of a plurality of relevant classification categories, into a synthesizer component, for outputting at least one synthetic labeled relevant data element for each one of the plurality of relevant classification categories, feeding the synthetic labeled relevant data elements and a plurality of unlabelled training relevant data elements into a domain adaptation component, for outputting a respective relevant classification category for each of the plurality of unlabelled training relevant data elements, iteratively end-to-end training the synthesis component and the domain adaptation component, and providing the trained domain adaption component, for outputting a relevant classification category in response to an input of a query unlabelled data element.

In a further implementation of the first, second, and third aspects, a number of the at least one labeled relevant data elements is 1-5 per relevant classification category.

In a further implementation of the first, second, and third aspects, further comprising, creating an initial model, wherein the model for classification of data elements is trained using the initial model, the initial model trained by: receiving the plurality of labeled auxiliary data elements denoting each of a plurality of auxiliary classification categories, feeding the plurality of labeled auxiliary data elements into the synthesizer component of the model, for outputting a plurality of synthetic labeled auxiliary data elements for each one of the plurality of auxiliary classification categories, feeding the synthetic labeled relevant data elements into a source input of the domain adaption component of the model and feeding another plurality of unlabelled auxiliary data elements into a target input of the domain adaptation component of the model, for outputting a certain auxiliary classification category selected from the plurality of auxiliary classification categories for each of the plurality of unlabelled auxiliary data elements, and iteratively end-to-end training the synthesis component and the domain adaptation component to create the initial model.

In a further implementation of the first, second, and third aspects, the synthesizer component is implemented as an extension of a delta-encoder component of the model that is trained to output a vector representation of the at least one synthetic labeled relevant data element for each one of the plurality of relevant classification categories in response to an input of the plurality of labeled auxiliary data elements and the at least one labeled relevant data elements.

In a further implementation of the first, second, and third aspects, further comprising: during the creation of the initial model, training a delta-faker component of the delta-encoder along with a delta-discriminator component of the delta-encoder, to mimic the delta-encoder component to output a fake vector representation in response to an input of the at least one labeled relevant data elements without the plurality of labeled auxiliary data elements, wherein the model is trained from the initial model by feeding the at least one labeled relevant data elements into the delta-faker and delta-discriminator components of the delta-encoder, without feeding the plurality of labeled auxiliary data elements.

In a further implementation of the first, second, and third aspects, each one of the plurality of labeled auxiliary data elements is labeled with a respective auxiliary classification category selected from a plurality of auxiliary classification categories, wherein the plurality of auxiliary classification categories are different than the plurality of relevant classification categories.

In a further implementation of the first, second, and third aspects, the data elements are images depicting visual objects, wherein the classification category is a visual classification category.

In a further implementation of the first, second, and third aspects, the domain adaptation component computes an adjustment to a distribution of the synthetic labeled relevant data elements to correlate with a distribution of the plurality of unlabelled training relevant data element, wherein the certain relevant classification category selected for each of the plurality of unlabelled training relevant data elements is computed based on the adjusted synthetic labeled relevant data elements.

In a further implementation of the first, second, and third aspects, the synthesizer component receives a certain labeled auxiliary data element and a corresponding labeled relevant data element for outputting a synthesized labeled relevant data element.

In a further implementation of the first, second, and third aspects, a number of labeled auxiliary data elements for each of a plurality of auxiliary classification categories is sufficient for training a standard classifier for accurate classification of a query data element into one of the plurality of auxiliary classification categories.

In a further implementation of the first, second, and third aspects, the end-to-end training the synthesis component and the domain adaptation component is iterated for minimizing an objective function of the domain adaptation component for the input of synthetic labeled relevant data elements outputted by the synthesize component and the plurality of unlabelled training relevant data elements.

In a further implementation of the first, second, and third aspects, further comprising: mapping each one of the labeled auxiliary data elements and the at least one labeled relevant data elements into a respective vector in a multi-dimensional space, wherein feeding comprises feeding the mapped respective vectors into the synthesizer component, wherein a distribution of at least one synthetic labeled relevant data element for each one of the plurality of relevant classification categories outputted by the synthesizer component is correlated to a distribution in the multi-dimensional space of mapped vectors of the labeled auxiliary data elements centered around the vectors of the at least one labeled relevant data elements.

In a further implementation of the first, second, and third aspects, the respective vectors are obtained from a non-classification layer of a neural network trained for classification of the labeled auxiliary data elements into corresponding labels selected from a plurality of auxiliary classification categories.

In a further implementation of the first, second, and third aspects, each one of the synthesizer component and the domain adaptation component are implemented as neural networks.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION

The present invention, in some embodiments thereof, relates to machine learning and, more specifically, but not exclusively, to systems and methods for training a model using a few-shot classification process.

An aspect of some embodiments of the present invention relates to systems, methods, an apparatus, and/or code instructions for computing a model for classification of a data element using a few-shot classification process. Multiple labeled auxiliary data elements denoting multiple auxiliary classification categories and one or more labeled relevant data elements for each of relevant classification categories are fed into a synthesizer component of the model. The few-show classification process is based on the number of the labeled relevant data elements (per relevant classification category) being few, for example, 1-5, 1-10, or other numbers considered as few, for example, insufficient to train a standard classifier using a standard approach for accurate classification, as described herein. The synthesizer component outputs synthetic labeled relevant data elements for each one of the relevant classification categories. The synthetic labeled relevant data elements and multiple unlabelled training relevant data elements are fed into a domain adaptation component of the model, for outputting a respective relevant classification category for each of the unlabelled training relevant data elements. The synthesis component and the domain adaptation component are iteratively trained end-to-end. The trained domain adaption component is provided for outputting a relevant classification category in response to an input of a query unlabelled data element.

Optionally, an initial version of the model is computed. The model for classification of data elements is trained using the initial model. The initial model is trained by feeding the labeled auxiliary data elements into the synthesizer component of the model, for outputting synthetic labeled auxiliary data elements for each one of the auxiliary classification categories. The synthetic labeled relevant data elements are fed into a source input of the domain adaption component. Other unlabelled auxiliary data elements are fed into a target input of the domain adaptation component, for outputting a certain auxiliary classification category selected from the auxiliary classification categories for each of the unlabelled auxiliary data elements. The synthesis component and the domain adaptation component are trained end-to-end to create the initial model.

An aspect of some embodiments of the present invention relates to systems, methods, an apparatus, and/or code instructions for classifying a query data element into a classification category by a model trained using a few-shot classification process. The query data element is fed into the trained domain adaptation component of the trained model. The model is trained using labeled auxiliary data elements (many of them) for each auxiliary classification category and one or more (i.e., few) labeled relevant data elements for each relevant classification category, as described herein. The trained domain adaptation component outputs the relevant classification category for the query data element.

At least some implementations of the systems, methods, apparatus, and/or code instructions described herein address the technical problem of improving the process of a semi-supervised few-shot classification process for training a model for classification of a new data element, for example, improving the accuracy of the classification output.

At least some implementations of the systems, methods, apparatus, and/or code instructions described herein improve the technological field of machine learning, in particular neural network models, by improving the process of training a neural network based model using a semi-supervised few-shot classification process, for example, improving the accuracy of the classification output.

Standard fully-supervised processes for training a model for accurate classification of data elements (e.g., a neural network based classifier) into one or more visual categories requires a large set of labeled training data elements that provide many samples of each possible visual category. The labeling is done manually by humans. The technical problem arises when such labeled data elements are difficult to obtain, for example, limited human resources capable of labeling the data elements, and/or high cost of labeling the data elements. For example, obtaining medical images with manual labels is difficult, since labeling is done by expert radiologists. Models trained using standard approaches with a limited sized set of labeled images have poor performance. At least some implementations of the systems, methods, apparatus, and/or code instructions described herein generate a high performance classifier using the limited set of labeled data elements (which may be generated relatively easily due to the small size of the set), in combination with an easily and/or widely available set of unlabelled data elements, for example, obtained from publicly available sources, such as data element databases.

The domain adaptation component described herein, even when based on standard practice architecture, is trained in a different way. Using a standard training approach, the domain adaptation component receives labeled source data, and unlabeled target data assumed to belong to same set of categories as the source data. The training includes learning a classifier for the target samples, that assigns labels (from the set of source labels) to these samples. In standard mode of operation, the domain adaptation component is trained in isolation, provided a fixed set of source labeled samples and a set of target samples. In particular, the domain adaptation component is trained (and evaluated) on exactly one collection of categories. In contrast, the training of the domain adaptation component is performed differently, as described herein. In particular, first, the input source samples are not fixed elements of a given dataset. The domain adaptation component is trained as a part of a larger network including the sample synthesizer described herein. The output of the synthesizer (producing synthetic examples) is fed into the source input of the domain adaptation component, and the joint training of the synthesizer and domain adaptation components is facilitated by the objective functions of the domain component for the input configuration described herein of ({synthetic samples, labels}, {target samples}). Second, there may be two training stages, corresponding to the need to (1) pre-train (bootstrap) the model on auxiliary categories in order to enable the few-shot learning regime and (2) train the model using the few-shot novel categories. Thus, the domain adaptation component plays a role in a larger model, where both the source and target data come from different sets of categories in the two training stages.

The synthesis process described herein, where the synthesizer component computes synthetic data elements, is different than other standard approaches for producing additional samples of a category based on a certain data element sample. Standard approaches are described, for example, by Swami Sankaranarayanan, Yogesh Balaji, Arpit Jain, Ser Nam Lim, Rama Chellappa, *Learning from Synthetic Data: Addressing Domain Shift for Semantic Segmentation, CVPR* 2018; and Atapour-Abarghouei, A. and Breckon, T. P. (2018) '*Real-time monocular depth estimation using synthetic data with domain adaptation.*', *CVPR* 2018. The synthesizer component described herein may be generated as an out-of-sample augmented data for relevant categories, rather than a manually designed graphics as done by the standard approaches. The synthesizer component described herein does not use a generative model (i.e., an explicit prescription of how to produce the examples), which is in contrast to the standard approaches, for example, graphically generated data elements which use a defined model to produce the samples, for example, rendered images of objects. Moreover, the synthesize component is trained jointly end-to-end with the domain adaptation component described herein, enabling the efficient utilization of the unlabeled data, which is absent in standard approaches. In another example, Yu-Xiong Wang, Ross Girshick, Martial Hebert, Bharath Hariharan, *Low-Shot Learning from Imaginary Data*, arXiv: 1801.05401 do not use unlabeled data elements, in contrast to the synthesizer component described herein that uses unlabeled data elements. In yet another example, Eli Schwartz, Leonid Karlinsky, Joseph Shtok, Sivan Harary, Manias Marder, Rogerio Feris, Abhishek Kumar, Raja Giryes, Alex M. Bronstein '*Delta-encoder: an effective sample synthesis method for few-shot object recognition*'. *NIPS* 2018 relate to an architecture that requires external sampling of deformations from pairs of training examples, which is a different approach from the systems, methods, and/or apparatus described herein that sample deformations using a generative model conditioned on the anchor input. Additional features of a delta-encoder implementation of the synthesizer component in comparison to a standard implementation of the delta-encoder are described below, for example, with reference to FIG. 4.

Additional improvements by at least some of the systems, methods, apparatus, and/or code instructions described herein over standard approaches include, for example, joint end-to-end training of the synthesizer component and the domain adaptation component, and/or using the domain adaptation component with synthesized data elements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
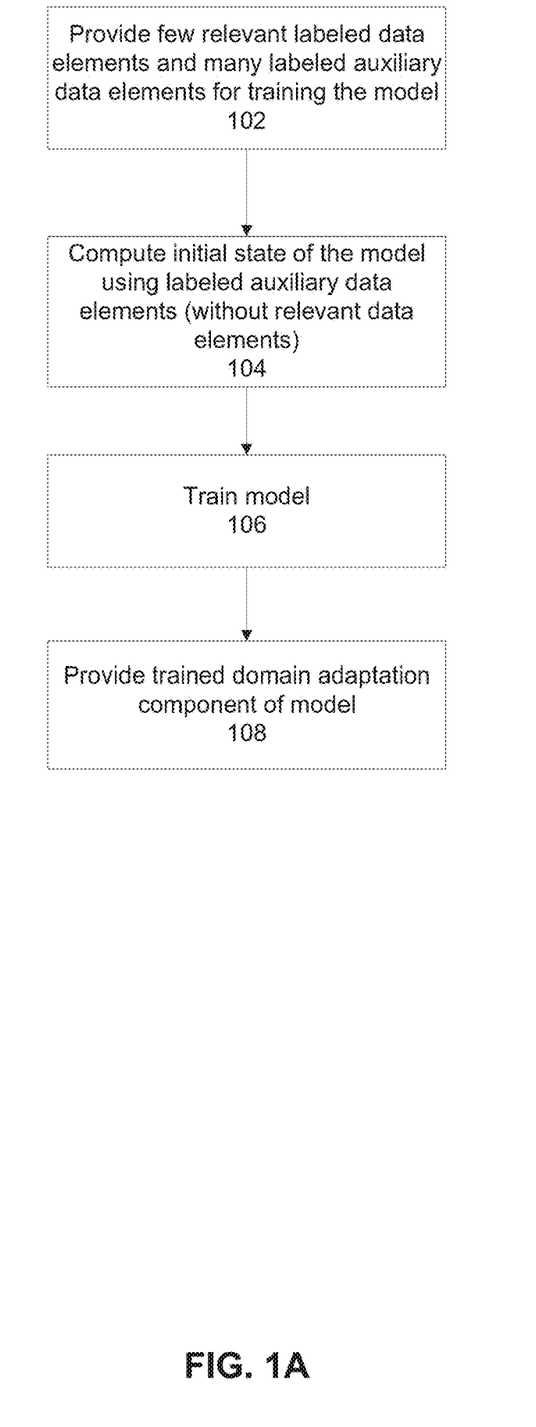
FIG. 1A is a high level flowchart of a method of computing a model for classification of a data element using few labeled training relevant data elements, in accordance with some embodiments of the present invention.
Figure 1B:
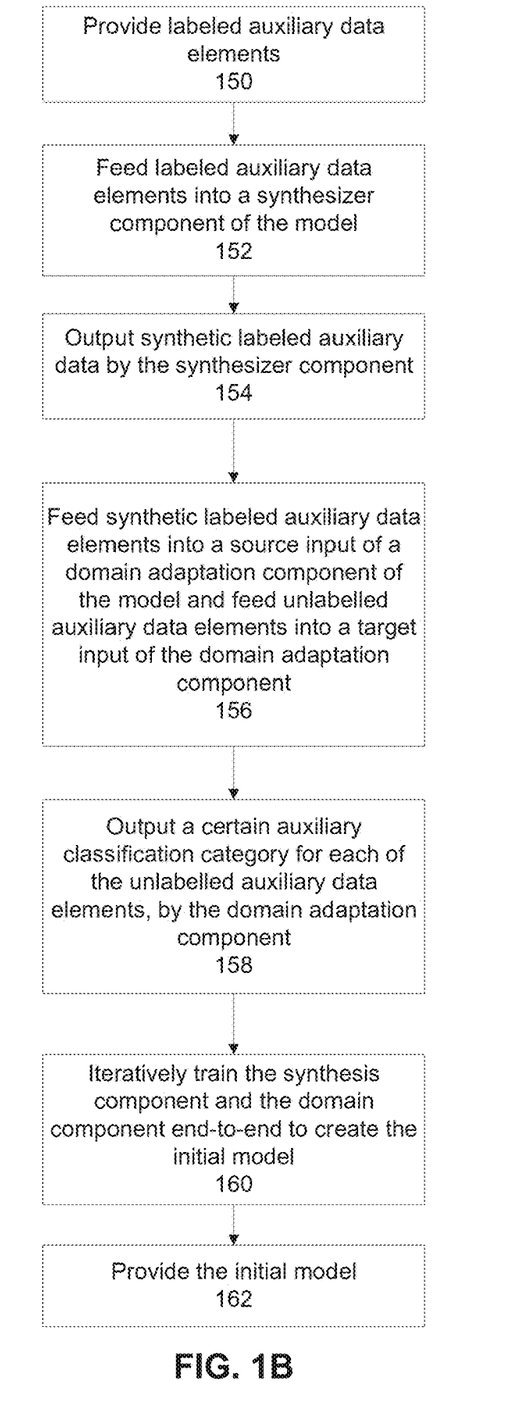
FIG. 1B, which is a flowchart of an exemplary method of computing an initial state of the model, in accordance with some embodiments of the present invention.
Figure 1C:
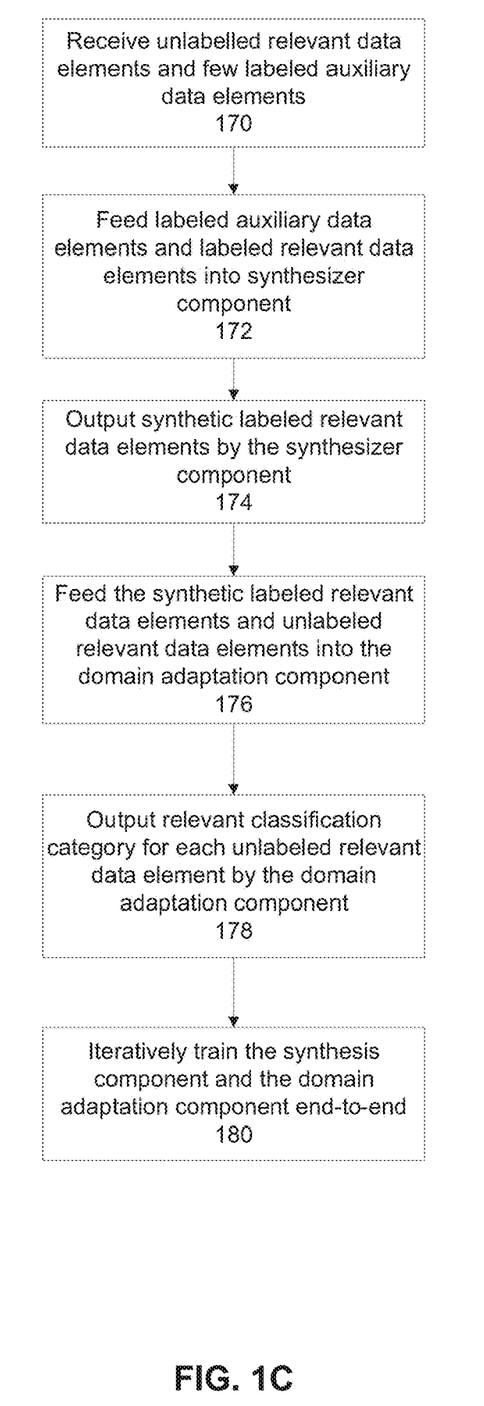
FIG. 1C is a flowchart of an exemplary method of computing the model for classification of a query data element, optionally using the initial model, in accordance with some embodiments of the present invention.
Figure 2:
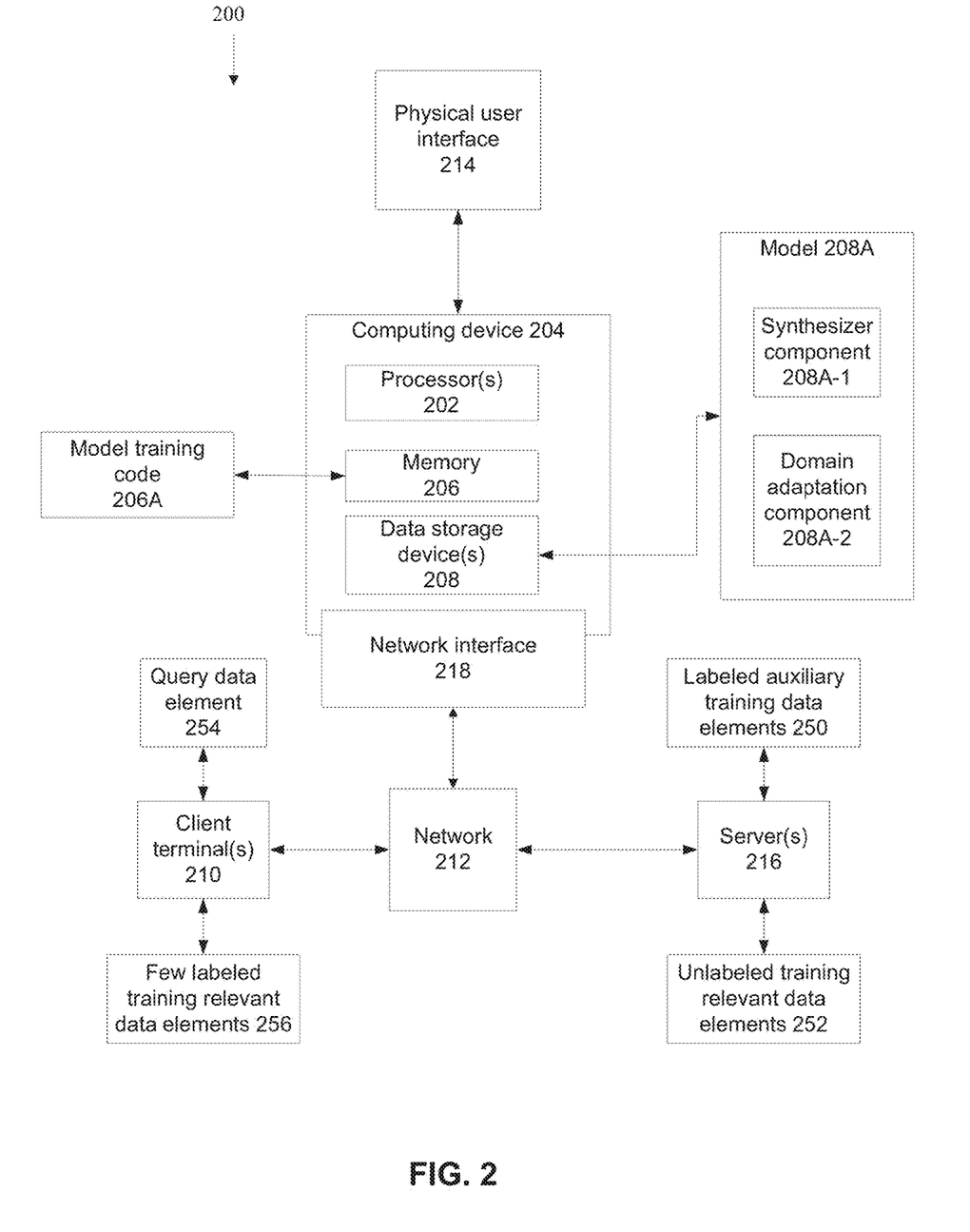
FIG. 2 is a block diagram of components of a system for training a model using few labeled training relevant data elements, and/or for classifying a data element using the model trained using few labeled training relevant data elements, in accordance with some embodiments of the present invention.
Figure 3:
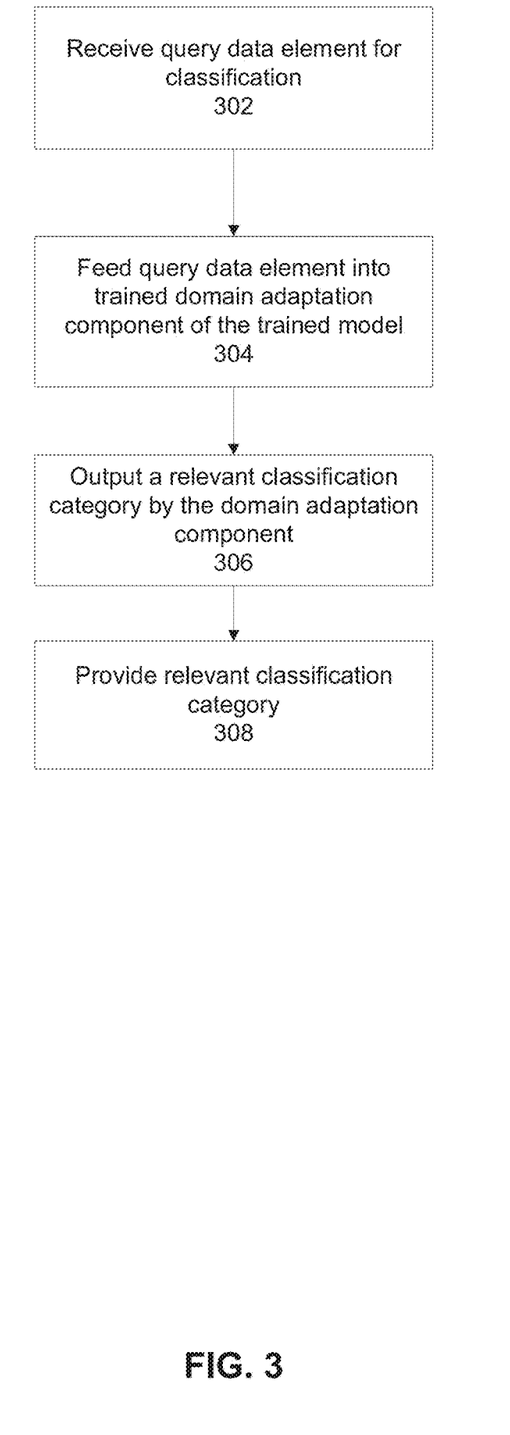
FIG. 3 is a flowchart of a method of classifying a data element using the model trained using few labeled training relevant data elements, in accordance with some embodiments of the present invention.

Reference is now made to FIGS. 1A-1C which are flowcharts of a method of training a model using few labeled training relevant data elements, in accordance with some embodiments of the present invention. Reference is also made to FIG. 2, which is a block diagram of components of a system 200 for training a model using few labeled training relevant data elements, and/or for classifying a data element using the model trained using few labeled training relevant data elements, in accordance with some embodiments of the present invention. Reference is also made to FIG. 3, which is a flowchart of a method of classifying a data element using the model trained using few labeled training relevant data elements, in accordance with some embodiments of the present invention. System 200 may implement the acts of the method described with reference to FIGS. 1A-1C and/or FIG. 3, by processor(s) 202 of a computing device 204 executing code instructions (e.g., code 206A and/or) stored in a memory 206 (also referred to as a program store).

Computing device 204 may be implemented as, for example one or more and/or combination of: a group of connected devices, a client terminal, a server, a virtual server, a computing cloud, a virtual machine, a smart television, a desktop computer, a thin client, a network node, a network server, and/or a mobile device (e.g., a Smartphone, a Tablet computer, a laptop computer, a wearable computer, glasses computer, and a watch computer).

Different architectures of system 200 may be implemented, for example:

Computing device 204 may be implemented as one or more servers (e.g., network server, web server, a computing cloud, a virtual server, a network node, a video storage server, a video editing station) that provides services to multiple client terminals 210 over a network 212, for example, receiving few labeled training relevant data elements 256, and creating a trained model 208A. Labeled auxiliary training data elements 250 and/or unlabeled training relevant data elements 252 may be obtained, for example, from client terminal 210, from server(s) 216, and/or from local storage associated with computing device 204. Each respective trained model 208A may be provided back to each corresponding client terminal 210. Alternatively or additionally, trained model 208A may be hosted by computing device 204 for providing remote data element classification services to client terminal(s) 210.

Communication between client terminal(s) 210 and/or server(s) 216 and/or computing device 204 over network 212 may be implemented, for example, via an application programming interface (API), software development kit (SDK), functions and/or libraries and/or add-ons added to existing applications executing on client terminal(s), an application for download and execution on client terminal 210 that communicates with computing device 204, function and/or interface calls to code executed by computing device 204, a remote access session executing on a web site hosted by computing device 204 accessed via a web browser executing on client terminal(s) 210.

Computing device 204 may be implemented as a stand-alone device (e.g., client terminal, smartphone, smart television, computing cloud, virtual machine, kiosk) that includes locally stored code that implement one or more of the acts described with reference to FIGS. 1A-1C and/or 3. For example, computing device 204 trains its own model (i.e., generating trained model 208A) using its own acquired few labeled training relevant data elements 256 and/or labeled auxiliary training data elements 250 and/or unlabeled training relevant data elements 252 (which may be obtained from different sources, as described herein) for its own data element classification requirements.

Computing device 204 may train model (i.e., generating trained model 208A) using its own acquired few labeled training relevant data elements 256 and/or labeled auxiliary training data elements 250 and/or unlabeled training relevant data elements 252 (which may be obtained from different sources, as described herein). Data element classification services using trained model 208A may be provided to client terminal(s) 210. For example, client terminal(s) 210 provide a query data element 254 to computing device 204 over network 212. Computing device 204 feeds query data element 254 into trained model 208A to obtain a classification category. The classification category is provided back to the respective querying client terminal 210.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIGS. 1A-1C when executed by hardware processor(s) 202. Memory 206 may store trained model 208A, for example, when feeding query data elements 254 into trained model 208A for obtaining a classification category. Model 208A may include a synthesizer component 208A-1 and/or domain adaptation component 208A-2, as described herein. It is noted that the trained model 208A may include domain adaptation component 208A-2 without synthesizer component 208A-1, for example, in when synthesizer component 208A-1 is used in the training process for end-to-end training with domain adaptation component 208A, and the classification of query data elements may be performed by the trained domain adaptation component 208A without synthesizer component 208A-1, as described herein. It is noted that synthesizer component 208A-1 and/or domain adaptation component 208A-2 may be included in model training code 206A.

Computing device 204 may include data storage device(s) 208 for storing data, for example, storing trained model 208A, few labeled training relevant data elements 256, and/or labeled auxiliary training data elements 250 and/or unlabeled training relevant data elements 252. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 include and/or are in communication with one or more physical user interfaces 214 that include a mechanism for user interaction, for example, to enter data (e.g., select query data element, assign labels to create labeled data elements, select training data elements) and/or view data (e.g., view the classification category of the query data element outputted by the model).

Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a smart television, a virtual server, a network server, a data element storage server, a cloud storage, a web server, a virtual machine, a thin client, and a mobile device.

Reference is now made to FIG. 1A, which is a high level flowchart of a method of computing a model for classification of a data element using few labeled training relevant data elements, in accordance with some embodiments of the present invention.

At 102, datasets of data elements for training the model are provided and/or designated and/or accessed. The data elements are each associated with a classification category, for example, labeled and/or tagged with the respective classification category. The classification category may be a semantic category.

Optionally, the data elements are images depicting visual objects. Other examples of data elements include: documents, text, code, audio (e.g., music) files, and numbers. The classification category is a visual classification category, optionally a label of the depicted visual object. For example, the visual classification categories are an indication of which animal is depicted in the image, for example, cat, dog, horse, and lion.

The datasets for training the model include relevant data elements, and auxiliary data elements. The relevant data elements and auxiliary data elements may be within the same classification domain, with relevant data elements and auxiliary data elements having distinct (i.e., non-overlapping) respective classification categories. For example, the relevant data elements and auxiliary data elements (e.g., images) are within the classification domain of animals. The relevant data elements include the classification category of lion, and the auxiliary data elements include the classification categories of dog, cat, and horse.

The number of relevant data elements with associated labels may be few due to, for example, difficulty in obtaining the relevant data elements and/or labels. For example, it may be difficult to obtain images of lions in the wild, while it may be easy to obtain images of dogs, cats, and horses, since these animals are domesticated. In another example, it may be difficult to obtain certain medical images with associated medical findings, for example, for rare medical conditions and/or when radiologists are difficult to access to assign labels to the images.

A standard classifier (e.g., standard neural network architecture) that is trained using only the labeled relevant data elements is statistically inaccurate for classification of a query data element into one of the relevant classification categories. The few samples of the labeled relevant data elements are insufficient to train the standard classifier to obtain a sufficient accuracy of classification. The number of relevant data elements with associated labels is few, for example, 1-5 per relevant classification category, or about 1-10, or about 1-3, or about 3-5, or about 3-10, or other ranges and/or numbers. It is noted that the number of relevant data elements that are considered as few may depend on the number of data elements required to obtain statistical accuracy for training the standard classifier. The number represented by few is the number below which is required to obtain a desired accuracy by the standard classifier.

The number of labeled auxiliary data elements may be large, for example, due to generally easy access and/or availability. For example, labeled auxiliary data elements may be obtained from large publicly accessible databases (e.g., databases of labeled images used to train standard neural networks) and/or may be easily created. For example, it may be easy to obtain the images of dogs, cats, and horses in the example discussed above.

The number of labeled auxiliary data elements (also referred to herein as large number) for each of the auxiliary classification categories may be sufficient for training a standard classifier for accurate classification of a query data element into one of the auxiliary classification categories. For example, the number of labeled auxiliary data elements is, for example, over 100 per auxiliary classification category, or over 1000, or over 10000, or over 100000, or 100-10000, or 1000-100000, or other ranges and/or values. The large number of images may be obtained, for example, as Imagenet classes (e.g., numerous animals, plants, and human-man objects).

Each one of the auxiliary data elements is labeled with a respective auxiliary classification category selected from multiple auxiliary classification categories. The auxiliary classification categories are different than (i.e., unique, non-overlapping with) the relevant classification categories.

In an exemplary implementation, the labeled relevant data elements are provided by a user (e.g., via a client terminal of the user), for example, the user takes a picture and enters a label. The auxiliary data elements may be obtained from public sources, such as publicly accessible databases. The public sources may be automatically determined and/or manually designated by the user.

At 104, an initial state of the model may be computed. The initial state of the model is obtained by training only with labeled auxiliary data elements, without the relevant data elements.

Alternatively, in some implementations, the initial state of the model is not computed, and the process proceeds to 106.

Reference is now made to FIG. 1B, which is a flowchart of an exemplary method of computing an initial state of the model (referred to herein as initial model), in accordance with some embodiments of the present invention.

At 150, the labeled auxiliary data elements denoting each of one or more (e.g., multiple) auxiliary classification categories are received and/or designated and/or accessed, as described herein.

At 152, the labeled auxiliary data elements are fed into the synthesizer component of the model.

Optionally, the synthesizer component is implemented as a neural network, optionally a deep neural network.

Optionally, the synthesizer component is implemented as an extension of a delta-encoder component of the model. The data-encoder is trained to output a vector representation of the synthetic labeled relevant data element for each one of the relevant classification categories, in response to an input of the labeled auxiliary data elements and the labeled relevant data element(s).

Optionally, during the creation of the initial model, a delta-faker component of the delta-encoder is trained along with a delta-discriminator component of the delta-encoder, to mimic the delta-encoder component to output a fake vector representation in response to an input of the labeled relevant data element(s) without the labeled auxiliary data elements.

Figure 4:
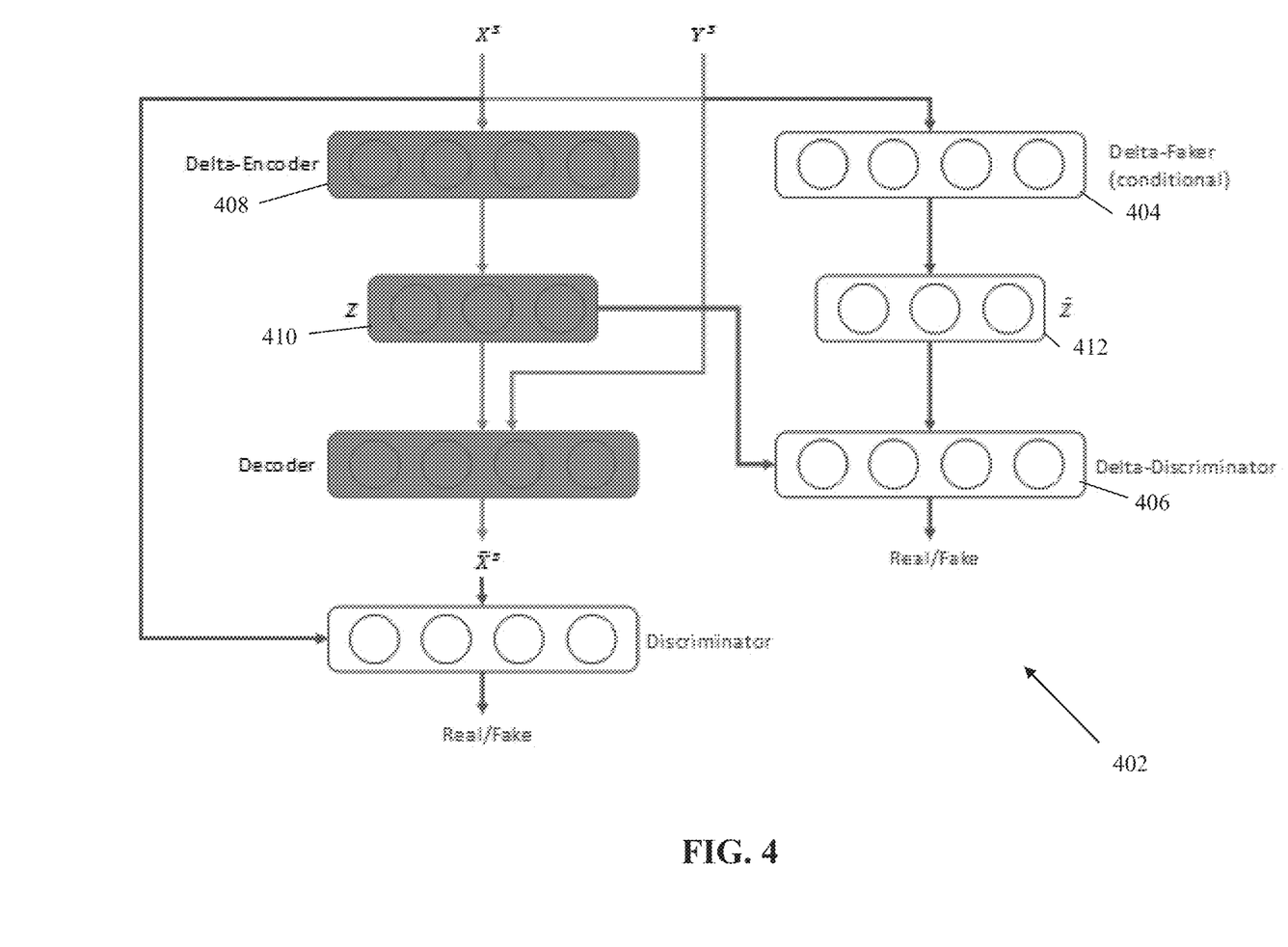
FIG. 4 is a dataflow diagram of an exemplary process and/or architecture implementation of the delta-encoder, in accordance with some embodiments of the present invention.

Reference is now made to FIG. 4, which is a dataflow diagram 402 of an exemplary process and/or architecture implementation of the delta-encoder, in accordance with some embodiments of the present invention.

The delta-encoder used for the synthesizer component may be an extension of additional features added to the standard delta-encoder described with reference to Eli Schwartz, Leonid Karlinsky, Joseph Shtok, Sivan Harary, Mattias Marder, Rogerio Feris, Abhishek Kumar, Raja Giryes and Alex M. Bronstein, '*Delta-encoder: an effective sample synthesis method for few-shot object recognition*', *NeurIPS* 2018, Montreal, which has at least one inventor in common with the present application, and which is incorporated herein by reference in its entirety. Using the standard delta-encoder process, the auxiliary data elements are used both to train the initial model, when the relevant categories are not used, and in the stage when the model is trained from the initial model, as described herein, for example, with reference to FIG. 1C. For training the model from the initial model (e.g., as described with reference to FIG. 1C), the inputs to the delta-encoder are a pair of data elements represented as (X,Y), where X denotes a certain auxiliary category and Y denotes a certain relevant category. The implementation of the delta-encoder described herein (e.g., as depicted in FIG. 4) includes additional features designed to remove the dependency on the auxiliary data defined by the standard implementation of the delta-encoder and allow using only the relevant data elements during training of the model from the initial model.

A Delta-Faker subnetwork 404 is trained during the training of the initial model (e.g., as described with reference to FIG. 1C), along with a Delta-discriminator subnetwork 406, in the extended architecture of the model 402. While the Delta-encoder subnetwork 408 learns to produce the real intermediate representation vector z 410, the Delta-Faker subnetwork 404 learns to mimic its behavior and produce a fake vector z 412, not from the pair (X,Y) but from Y alone. Then, in the model training stage (from the initial model, as described with reference to FIG. 1C), the necessity to provide permanent sample X is removed.

It is noted that the standard implementation of the Delta-encoder process synthesizes data elements from input data elements. The implementation of the delta-encoder described herein may be considered an extension of the standard delta-encoder implementation, with the added features of synthesizing the intermediate representation vector z 410, which aids in synthesizing the final output synthetic data element.

Referring now back to FIG. 1B, at 154, the synthesizer component outputs multiple synthetic labeled auxiliary data elements for each one of the auxiliary classification categories.

At 156, the synthetic labeled relevant data elements are fed into a source input of the domain adaption component of the model. Other unlabelled auxiliary data elements are fed into a target input of the domain adaptation component of the model.

Optionally, the domain adaptation component is implemented as a neural network, optionally a deep neural network.

The domain adaptation component may be implemented, for example, based on the VADA and/or DIRT-T, as described with reference to Rui Shu, Hung H. Bui, Hirokazu Narui, Stefano Ermon, *A DIRT-T Approach to Unsupervised Domain Adaptation*, arXiv:1802.08735, which is incorporated herein by reference in its entirety.

At 158, the domain adaptation component output a certain auxiliary classification category selected from the multiple auxiliary classification categories for each one of the unlabelled auxiliary data elements.

At 160, the synthesis component and the domain adaptation component are iteratively training end-to-end to create the initial model.

At 162, the initial model is provided, for example, stored in a memory and/or data storage device and/or provided to another computing device and/or another process for further training (e.g., in an implementation where the initial model is trained by one computing device and/or process and the model is trained using the initial model by another computing device and/or another process, or alternatively the same computing device and/or same process computes the model from the initial model).

Referring now back to FIG. 1A, at 106, the model is trained.

Optionally, the model is trained using the initial model. The initial model may be used as a starting point. The initial model may be updated with additional training to create the model.

Reference is now made to FIG. 1C, which is a flowchart of an exemplary method of computing the model for classification of a query data element, optionally using the initial model, in accordance with some embodiments of the present invention.

At 170, unlabelled training relevant data elements, labeled auxiliary data elements, and one or more (i.e., few) labeled relevant data elements for each relevant classification category, are received and/or designated and/or accessed, as described herein.

At 172, the labeled auxiliary data elements and the one or more (i.e., few) labeled relevant data elements for each of the relevant classification categories, are fed into the synthesizer component of the model.

The synthesizer component is designed to receive a certain labeled auxiliary data element and a corresponding labeled relevant data element, and output a synthesized labeled relevant data element.

Optionally, each one of the labeled auxiliary data elements and the labeled relevant data elements are mapped into a respective vector in a multi-dimensional space, optionally an embedding space. The mapped vectors are fed into the synthesizer component.

The respective vectors may be computed as an embedding by a neural network, optionally a convolutional neural network (CNN), for example, obtained from a non-classification layer of the neural network trained for classification of the labeled auxiliary data elements into corresponding labels selected from auxiliary classification categories. The non-classification layer may be the last layer before the classification layer. The last classification layer of the neural network may be removed, such that the neural network outputs the vector representation.

At 174, the synthesizer component outputs one or more synthetic labeled relevant data elements for each one of the relevant classification categories.

Optionally, a distribution of synthetic labeled relevant data element(s) for each one of the relevant classification categories outputted by the synthesizer component is correlated to a distribution in the multi-dimensional space of the mapped vectors of the labeled auxiliary data elements centered around the vectors of the labeled relevant data elements.

A set of vectors, produced by the non-classification layer from data elements of a certain category may be said to be distributed in the embedding space in a 'good' fashion when the distribution is low-dimensional, i.e., the distribution lies on a low-dimensional smooth manifold in the space, and has only few modes (i.e., well grouped together).

During training, the synthesizer component learns the intra-class variations of data elements from the same category, thus essentially learning the distributions of the auxiliary categories.

In the synthesis process, a pair of data elements, one from an auxiliary category, and one from a relevant category, are provided as input into the synthesizer component. A new sample from a relevant category is synthesized and outputted by the synthesizer component. When the synthesis is invoked with numerous samples of the same auxiliary category and one or few samples of relevant categories, the resulting distribution of the synthetic data elements resembles (e.g., is statistically significantly correlated to) the distribution of the auxiliary category, centered around the relevant category data elements.

At 176, the synthetic labeled relevant data elements and the unlabelled training relevant data elements are fed into the domain adaptation component of the model.

Optionally, the domain adaptation component computes an adjustment to a distribution of the synthetic labeled relevant data elements to correlate with a distribution of the unlabelled training relevant data element(s). The certain relevant classification category selected for each of the unlabelled relevant data elements is computed based on the adjusted synthetic labeled relevant data elements.

At 178, the domain adaptation component outputs a respective relevant classification category for each of the unlabelled training relevant data elements.

At 180, the synthesis component and the domain adaptation component are iteratively trained end-to-end. The end-to-end iterative training may be performed for minimizing an objective function of the domain adaptation component for the input of the synthetic labeled relevant data elements (i.e., outputted by the synthesize component) and the unlabelled training relevant data elements. The objective function may be, for example, as described with reference to Rui Shu, Hung H. Bui, Hirokazu Narui, Stefano Ermon, *A DIRT-T Approach to Unsupervised Domain Adaptation, arXiv*:1802.08735, which is incorporated herein by reference in its entirety.

Figure 5:
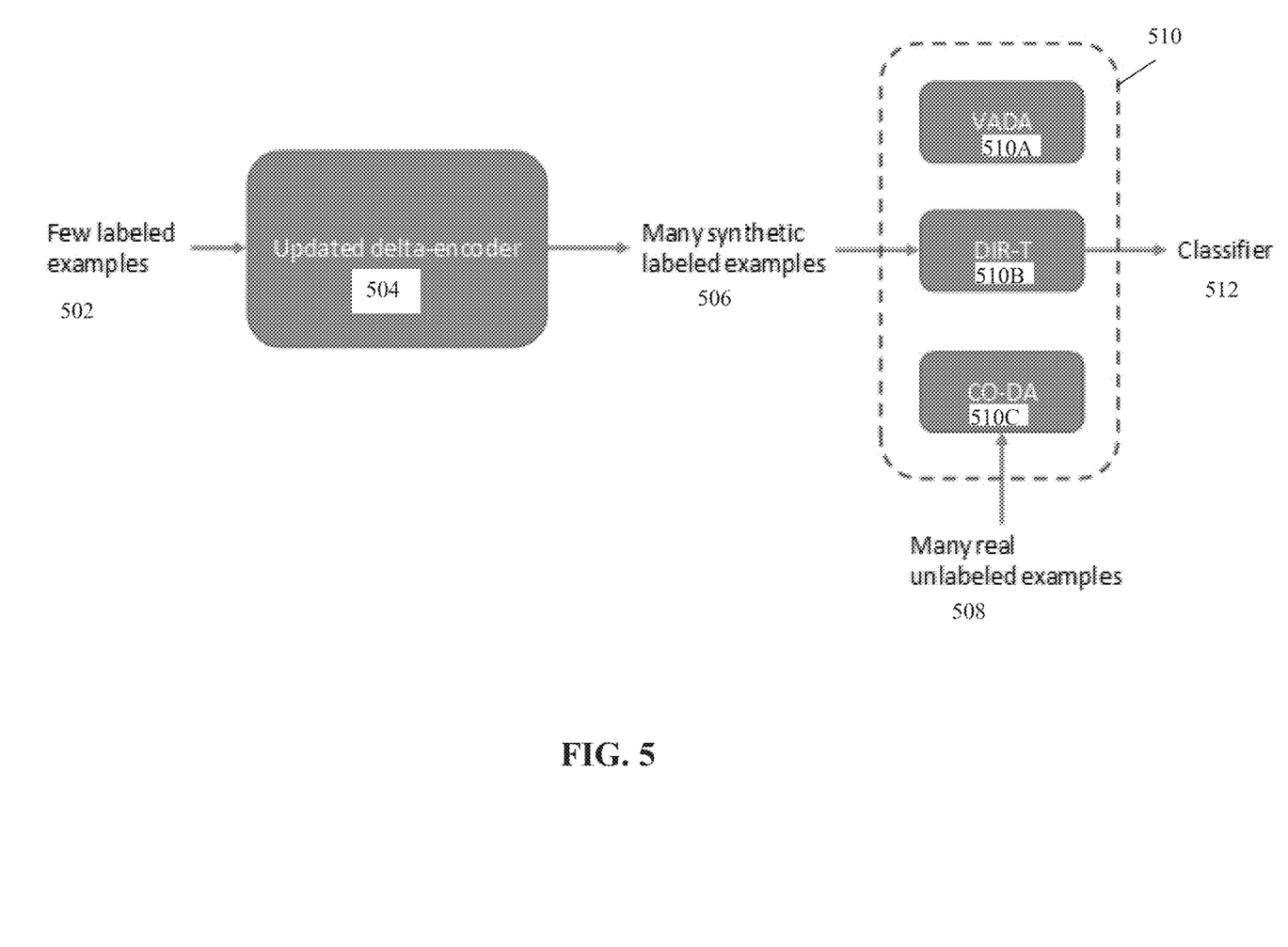
FIG. 5 is a dataflow diagram depicting an exemplary process for training the model using the initial model, in accordance with some embodiments of the present invention.

Reference is now made to FIG. 5, which is a dataflow diagram depicting an exemplary process for training the model using the initial model, in accordance with some embodiments of the present invention. The dataflow described with reference to FIG. 5 may be based on and/or integrated with and/or substituted for one or more features of the methods described with reference to FIGS. 1A-1C and/or by components of system 200 described with reference to FIG. 2.

Few labeled relevant data element(s) 502 are fed into an updated delta-encoder 504, computed as described with reference to 152 of FIG. 1B. Updated delta-encoder 504 includes the delta-faker and delta-discriminator components, as described herein. Updated delta-encoder 504 outputs many synthetic labeled data element examples 506 without being fed labeled auxiliary data element examples 508. Many synthetic labeled data element examples 506 and labeled auxiliary data element examples 508 are fed into a domain adaptation component 510 which computes a classifier 512 for classification of a new unlabelled query data element. Classifier 512 is the domain adaptation component 510 after iterative end-to-end training with the synthesizer component, as described herein.

Domain adaptation component 510 may be implemented, for example, using VADA 510A, DIR-T 510B, and/or CO-DA 510C.

Referring now back to FIG. 1A, at 108, the trained domain adaption component is provided. The trained domain adaptation component is used for outputting a relevant classification category in response to an input of a query unlabelled data element. The trained domain adaptation component may be, for example, stored on a memory and/or data storage device of a computing device, provided to another computing device (e.g., to a server over a network), and/or provided to another process (e.g., for integration within another dataflow).

It is noted that the synthesizer component, which is trained end-to-end with the domain adaptation component, is not necessarily required for classification of unlabelled query data elements. The classification of query data elements is performed by the trained domain adaptation component without with trained synthesizer component.

Reference is now made back to FIG. 3.

At 302, a query data element is received for classification into a classification category by the trained model. The query data element is unlabelled. For example, the query data element is an image for classification.

At 304, the query data element is fed into the trained domain adaption component of the model.

At 306, a relevant classification category for the query data element is outputted by the trained domain adaptation component.

At 308, the relevant classification category is provided, for example, locally stored in a memory and/or data storage device, provided to the client terminal from which the query data element originated, and/or provided to another process for further processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant models and data elements will be developed and the scope of the terms model and data elements are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of computing a model for classification of a data element, comprising:

feeding a plurality of labeled auxiliary data elements and at least one labeled relevant data elements for each of a plurality of relevant classification categories, into a synthesizer component comprising a neural network, for outputting at least one synthetic labeled relevant data element for each one of the plurality of relevant classification categories, wherein the synthesizer component is implemented as an extension of a delta-encoder component of a model that is trained to output a vector representation of the at least one synthetic labeled relevant data element for each one of the plurality of relevant classification caterogies in response to an input of the plurality of labeled auxiliary data elements and the at least one labeled relevant data elements;

feeding the synthetic labeled relevant data elements and a plurality of unlabelled training relevant data elements into a domain adaptation component comprising a neural network, for outputting a respective relevant classification category for each of the plurality of unlabelled training relevant data elements;

iteratively end-to-end training the synthesis component and the domain adaptation component; and providing the trained domain adaption component, for outputting a relevant classification category in response to an input of a query unlabelled data element.

2. The method of claim 1, wherein a number of the at least one labeled relevant data elements is 1-5 per relevant classification category.

3. The method of claim 1, further comprising, creating an initial model, wherein the model for classification of data elements is trained using the initial model, the initial model trained by:

receiving the plurality of labeled auxiliary data elements denoting each of a plurality of auxiliary classification categories;

feeding the plurality of labeled auxiliary data elements into the synthesizer component of the model, for outputting a plurality of synthetic labeled auxiliary data elements for each one of the plurality of auxiliary classification categories;

feeding the synthetic labeled relevant data elements into a source input of the domain adaption component of the model and feeding another plurality of unlabelled auxiliary data elements into a target input of the domain adaptation component of the model, for outputting a certain auxiliary classification category selected from the plurality of auxiliary classification categories for each of the plurality of unlabelled auxiliary data elements; and iteratively end-to-end training the synthesis component and the domain adaptation component to create the initial model.

4. The method of claim 1, further comprising:

during the creation of the initial model, training a delta-faker component of the delta-encoder along with a delta-discriminator component of the delta-encoder, to mimic the delta-encoder component to output a fake vector representation in response to an input of the at least one labeled relevant data elements without the plurality of labeled auxiliary data elements, wherein the model is trained from the initial model by feeding the at least one labeled relevant data elements into the delta-faker and delta-discriminator components of the delta-encoder, without feeding the plurality of labeled auxiliary data elements.

5. The method of claim 1, wherein each one of the plurality of labeled auxiliary data elements is labeled with a respective auxiliary classification category selected from a plurality of auxiliary classification categories, wherein the plurality of auxiliary classification categories are different than the plurality of relevant classification categories.

6. The method of claim 1, wherein the data elements are images depicting visual objects, wherein the classification category is a visual classification category.

7. The method of claim 1, wherein the domain adaptation component computes an adjustment to a distribution of the synthetic labeled relevant data elements to correlate with a distribution of the plurality of unlabelled training relevant data element, wherein the certain relevant classification category selected for each of the plurality of unlabelled training relevant data elements is computed based on the adjusted synthetic labeled relevant data elements.

8. The method of claim 1, wherein the synthesizer component receives a certain labeled auxiliary data element and a corresponding labeled relevant data element for outputting a synthesized labeled relevant data element.

9. The method of claim 1, wherein a number of labeled auxiliary data elements for each of a plurality of auxiliary classification categories is sufficient for training a standard classifier for accurate classification of a query data element into one of the plurality of auxiliary classification categories.

10. The method of claim 1, wherein the end-to-end training the synthesis component and the domain adaptation component is iterated for minimizing an objective function of the domain adaptation component for the input of synthetic labeled relevant data elements outputted by the synthesize component and the plurality of unlabelled training relevant data elements.

11. The method of claim 1, further comprising:
mapping each one of the labeled auxiliary data elements and the at least one labeled relevant data elements into a respective vector in a multi-dimensional space,
wherein feeding comprises feeding the mapped respective vectors into the synthesizer component,
wherein a distribution of at least one synthetic labeled relevant data element for each one of the plurality of relevant classification categories outputted by the synthesizer component is correlated to a distribution in the multi-dimensional space of mapped vectors of the labeled auxiliary data elements centered around the vectors of the at least one labeled relevant data elements.

12. The method of claim 1, wherein the neural network comprising the synthesizer component comprises a deep neural network, and the neural network comprising the domain adaptation component comprises a deep neural network.

13. The method of claim 11, wherein the respective vectors are obtained from a non-classification layer of a neural network trained for classification of the labeled auxiliary data elements into corresponding labels selected from a plurality of auxiliary classification categories.

14. A method of classifying a query data element into a classification category by a model, comprising:
feeding a query data element into a domain adaption component trained by:
feeding a plurality of labeled auxiliary data elements and at least one labeled relevant data elements for each of a plurality of relevant classification categories, into a synthesizer component comprising a neural network, for outputting at least one synthetic labeled relevant data element for each one of the plurality of relevant classification categories, wherein the synthesizer component is implemented as an extension of a delta-encoder component of a model that is trained to output a vector representation of the at least one synthetic labeled relevant data element for each one of the plurality of relevant classification categories in response to an input of the plurality of labeled auxiliary data elements and the at least one labeled relevant data elements,
feeding the synthetic labeled relevant data elements and a plurality of unlabelled training relevant data elements into a domain adaptation component comprising a neural network, for outputting a respective relevant classification category for each of the plurality of unlabelled training relevant data elements, and
iteratively end-to-end training the synthesis component and the domain adaptation component; and
outputting a relevant classification category for the query data element by the trained domain adaptation component.

15. The method of claim 14, wherein a number of the at least one labeled relevant data elements is 1-5 per relevant classification category.

16. The method of claim 14, further comprising, creating an initial model, wherein the model for classification of data elements is trained using the initial model, the initial model trained by:
receiving the plurality of labeled auxiliary data elements denoting each of a plurality of auxiliary classification categories;
feeding the plurality of labeled auxiliary data elements into the synthesizer component of the model, for outputting a plurality of synthetic labeled auxiliary data elements for each one of the plurality of auxiliary classification categories;
feeding the synthetic labeled relevant data elements into a source input of the domain adaption component of the model and feeding another plurality of unlabelled auxiliary data elements into a target input of the domain adaptation component of the model, for outputting a certain auxiliary classification category selected from the plurality of auxiliary classification categories for each of the plurality of unlabelled auxiliary data elements; and
iteratively end-to-end training the synthesis component and the domain adaptation component to create the initial model.

17. The method of claim 14, wherein each one of the plurality of labeled auxiliary data elements is labeled with a respective auxiliary classification category selected from a plurality of auxiliary classification categories, wherein the plurality of auxiliary classification categories are different than the plurality of relevant classification categories.

18. The method of claim 14, wherein the data elements are images depicting visual objects, wherein the classification category is a visual classification category.

19. The method of claim 14, wherein the domain adaptation component computes an adjustment to a distribution of the synthetic labeled relevant data elements to correlate with a distribution of the plurality of unlabelled training relevant data element, wherein the certain relevant classification category selected for each of the plurality of unlabelled training relevant data elements is computed based on the adjusted synthetic labeled relevant data elements.

20. A system for computing a neural network model for classification of a data element, comprising:
at least one hardware processor executing a code for:
feeding a plurality of labeled auxiliary data elements and at least one labeled relevant data elements for each of a plurality of relevant classification categories, into a synthesizer component comprising a neural network, for outputting at least one synthetic labeled relevant data element for each one of the plurality of relevant classification categories, wherein the synthesizer component is implemented as an extension of a delta-encoder component of a model that is trained to output a vector representation of the at least one synthetic labeled relevant data element for each one of the plurality of relevant classification categories in response to an input of the plurality of labeled auxiliary data elements and the at least one labeled relevant data elements;
feeding the synthetic labeled relevant data elements and a plurality of unlabelled training relevant data elements into a domain adaptation component comprising a neural network, for outputting a respective relevant classification category for each of the plurality of unlabelled training relevant data elements;
iteratively end-to-end training the synthesis component and the domain adaptation component; and
providing the trained domain adaption component, for outputting a relevant classification category in response to an input of a query unlabelled data element.

* * * * *